United States Patent
Ghosh et al.

(10) Patent No.: US 9,527,073 B2
(45) Date of Patent: Dec. 27, 2016

(54) PROCESS FOR THE PREPARATION OF ANION EXCHANGE MEMBRANE

(71) Applicant: COUNCIL OF SCIENTIFIC & INDUSTRIAL RESEARCH, New Delhi (IN)

(72) Inventors: Pushpito Kumar Ghosh, Bhavnagar (IN); Saroj Sharma, Bhavnagar (IN); Milan Dinda, Bhavnagar (IN); Chiragkumar Rameshbhai Sharma, Bhavnagar (IN); Uma Chatterjee, Bhavnagar (IN); Vaibhav Kulshreshtha, Bhavnagar (IN); Soumyadeb Ghosh, Bhavnagar (IN); Babulal Surabhai Makwana, Bhavnagar (IN); Sreekumaran Thampy, Bhavnagar (IN); Girish Rajanikant Desale, Bhavnagar (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 14/647,067

(22) PCT Filed: Nov. 25, 2013

(86) PCT No.: PCT/IN2013/000712
§ 371 (c)(1),
(2) Date: May 22, 2015

(87) PCT Pub. No.: WO2014/080427
PCT Pub. Date: May 30, 2014

(65) Prior Publication Data
US 2015/0298116 A1    Oct. 22, 2015
US 2016/0243539 A2    Aug. 25, 2016

(30) Foreign Application Priority Data

Nov. 23, 2012  (IN) .......................... 3598/DEL/2012

(51) Int. Cl.
| | |
|---|---|
| *B01J 41/14* | (2006.01) |
| *C08J 5/22* | (2006.01) |
| *B01D 67/00* | (2006.01) |
| *B01D 71/28* | (2006.01) |
| *B01J 47/12* | (2006.01) |
| *C02F 1/469* | (2006.01) |
| *C02F 103/08* | (2006.01) |
| *B01D 61/42* | (2006.01) |

(52) U.S. Cl.
CPC ............ *B01J 41/14* (2013.01); *B01D 67/0093* (2013.01); *B01D 71/28* (2013.01); *B01J 47/12* (2013.01); *C08J 5/2243* (2013.01); *C08J 5/2275* (2013.01); *B01D 61/42* (2013.01); *B01D 2325/42* (2013.01); *C02F 1/4693* (2013.01); *C02F 2103/08* (2013.01); *C08J 2325/18* (2013.01); *C08J 2423/06* (2013.01); *C08J 2427/06* (2013.01)

(58) Field of Classification Search
CPC ......... B01J 41/14; C08J 5/2243; C08J 5/2275; C08J 2325/18; C08J 2423/06; C08J 2427/06; B01D 67/0093; B01D 71/28; B01D 61/42; B01D 2325/42; C02F 1/4693; C02F 2103/08
USPC ........................................................ 521/27
See application file for complete search history.

(56) References Cited

FOREIGN PATENT DOCUMENTS

| | | | |
|---|---|---|---|
| EP | 1384746 | 1/2004 | |
| JP | EP 1384746 A1 * | 1/2004 | ............ B01D 61/48 |
| JP | 2007/194048 | 8/2007 | |
| JP | 2007194098 A * | 8/2007 | |

OTHER PUBLICATIONS

Hibbs et al. "Poly(phenylene)-Based Anion Exchange Membranes for Alkaline Fuel Cells", ESC Transactions, 19 (30), pp. 89-97 (2009).*
Zeng et al. "Anion exchange membranes based on quaternized polystyrene-block-poly(ethylene-ran-butylene)-block-polystyrene for direct methanol alkaline fuel cells", Journal of Membrane Science, vol. 349 (2010).*
International Search Report dated Mar. 25, 2014.
Zeng Q.H. et al. "Anion exchange membranes based on quaternized polystyrene-block-poly (ethylene-ran-butylene)-block-polystyrene for direct methanol alkaline fuel cells" *Journal of Membrane Science* vol. 349, No. 1-2, pp. 237-243 (2010).
Hibbs M. et al. "Poly(phenylene)-Based Anion Exchange Membranes for Alkaline Fuel Cells" *ECS Transactions* p. 89-97 (2009).

* cited by examiner

Primary Examiner — Michael M Bernshteyn
(74) Attorney, Agent, or Firm — Workman Nydegger

(57) ABSTRACT

The present invention describes the process of preparation of inter-polymer film of p-methylstyrene-co-divinylbenzene and its conversion into anion exchange membrane through a greener route which dispenses with the use of chloromethyl ether. The membrane with polyethylene binder is shown to have equivalent or even superior performance to anion exchange membrane prepared from styrene-co-divinylbenzene/polyethylene through chloromethyl ether route.

22 Claims, 2 Drawing Sheets

US 9,527,073 B2

PROCESS FOR THE PREPARATION OF ANION EXCHANGE MEMBRANE

FIELD OF INVENTION

The present invention relates to a process for preparation of an anion exchange membrane which is safe and convenient compared to conventional methods. Particularly, this method relates to the preparation of quaternized anion exchange membranes (AEMs) via benzylic bromination of crosslinked methyl substituted aromatic polymer followed by amination and its application for water desalination. The developed anion exchange membrane exhibits significant desalination behavior and can be used for all applications where such ion exchange membranes are required.

BACKGROUND OF INVENTION

Anion exchanges are generally prepared by quaternization of crosslinked chloromethylated polystyrene-DVB polymeric film. The synthesis of intermediate halomethylated (chloromethylated) polystyrene-DVB membranes involves the use of carcinogenic chloromethyl ether (CME). The use of CME for AEM preparation is hazardous to health.

The article "A novel positively charged composite membrane for nanofiltration prepared from poly (2,6-dimethyl-1,4-phenyleneoxide) by in situ amine crosslinking" published in J. Memb. Sci., 215, 25-32 (2003), by Tongwen et. al., describes the preparation of anion exchange resin from linear engineering plastics poly(2,6-dimethyl-1,4-phenylene oxide) (PPO) and its characterization. A base substrate made of aryl-brominated PPO polymers and a top layer made of benzyl- and aryl-brominated PPO polymers are taken together and subjected to in-situ amine crosslinking to obtain a membrane. The resultant membrane was characterized with pure water flux and rejection of electrolytes $MgCl_2$ and NaCl. The properties of the nanofiltration membrane are significantly affected by the type of brominated polymers of the top layer, the amination time, and the composition of amination medium.

The article "Anion Exchange Membranes by Bromination of Benzylmethyl-Containing Poly(sulfone)s", published in Macromolecules, 43, 2349-2356, (2010), by Jingling Yan and Michael A. Hickner, discloses the properties of anion-conducting membranes synthesized by halomethylation and quaternization of benzylmethyl-containing poly(sulfone)s. The benzylmethyl moieties serve as precursors to cationic sites, are introduced during polymer synthesis, thereby circumventing post modification of the polymer by chloromethylation.

The article entitled "Fundamental studies of a new series of anion exchange membranes: Membranes prepared from bromomethylated poly(2,6-dimethyl-1,4-phenylene oxide) (BPPO) and pyridine", published in Journal of Membrane Science 279 (2006) 200-208, by Ming Gong et. al., describes how anion exchange membranes containing pyridinium groups were prepared by quaternization of bromomethylated poly(2,6-dimethyl-1,4-phenylene oxide) (BPPO) membrane with pyridine. The prepared. AEM showed relatively low IEC, high water content and low membrane potential, which was due to the erosion of pyridine during the amination reaction.

Reference may be made to an article by Blanc, G. L., published in Bull. Soc. Chin., France, 33, 313, (1923), wherein they disclosed that the halomethylated aromatic hydrocarbons and polymeric analogues are promising key intermediate for the synthesis of many valuable chemicals for targeted applications for both laboratory and industrial scale. The halomethylation reaction particularly, Lewis acid catalyzed chloromethylation of aromatic group is an important intermediates step in realizing polymeric materials.

The article entitled "Porogenic Solvents Influence on Morphology of 4-Vinylbenzyl Chloride Based PolyHIPEs", published in Macromolcules, 41, 3543-3546 (2008), by Peter Krajnc et. al., describes how the poly(high internal phase emulsion) materials were prepared from concentrated emulsions containing 4-vinylbenzyl chloride as the reactive monomer and divinylbenzene as the cross-linker. The process of drying the polyHIPE materials also influenced the wet porosity. They have not attempted directly from methyl vinyl benzene.

The article entitled "A New Strategy to Microporous Polymers: Knitting Rigid Aromatic Building Blocks by External Cross-Linker", published in Macromolcules, 44, 2410-2414 (2011), by Bien Tan et. al. They describe a series of microporous polymers via a low-cost versatile strategy, which involves "knitting" rigid aromatic building blocks, such as benzene, biphenyl, 1,3,5-triphenylbenzene, methylbenzene, chlorobenzene, and phenol using an external cross-linker. These materials are predominantly microporous and exhibit high surface areas. Moreover, different building blocks can generate materials with different pore structures, functional groups and application properties, which are significant for materials design. They used dimethoxymethane as linkers instead of CME.

OBJECTS OF THE INVENTION

The main object of the present invention is to provide a process for preparation of anion exchange membrane.

Another object of the present invention is to prepare styrene-co-divinylbenzene (Sty-co-DVB) type polymeric anion exchange membranes bearing quaternary ammonium groups in a safe and eco-friendly manner.

Another object of the present invention is to provide a process to avoid the use of hazardous chloromethyl ether (CME) for chloromethylation of the aromatic ring of styrene moiety to introduce a —$CH_2Cl$ group.

Yet another object of the present invention is to provide a process to recognize that bromomethyl group (—$CH_2Br$) would be even more efficient for quaternization.

Yet another object is to recognize that there is more than one way to introduce bromomethyl group (—$CH_2Br$) essential for quaternization.

Yet another object is to recognize that bromination of the methyl group of the polymer formed from p-methylstyrene (p-MS) and divinylbenzene (DVB) would result in such a bromomethyl group.

Yet another object is to undertake such bromination reaction directly on inter-polymer films prepared by casting and melt extrusion process.

Yet another object is to demonstrate such equivalence of performance through electrodialysis-based desalination, keeping the cation exchange membrane constant.

SUMMARY OF THE INVENTION

Accordingly, the present invention provides a process for the preparation of inter-polymer anion exchange membrane wherein the said process comprises the steps of:
a) preparing an inter-polymer film of p-methylstyrene-co-divinyl benzene ((p-MS-co-DVB)/binder by adding p-methylstyrene as monomer, divinylbenzene as cross-linker, benzoyl peroxide as radical initiator either neat or into a solution of PVC in a solvent under stirring at a temperature ranging between 60-70° C. for a period ranging between 3-5 hrs, followed by pouring the said solution on a glass plate and casting, subsequently drying, at a temperature ranging between 11-14 hrs at 25-35° C. to obtain inter-polymer film;

b) optionally, preparing an inter-polymer film by adding a mixture of p-methyl styrene, divinylbenzene, benzoyl peroxide and toluene into a melted mixture of binder under constant stirring at 80-95° C. for a period ranging between 3-5 hrs followed by increasing the temperature ranging between 130-140° C. to distill out the solvent from the polymer mixture to obtain noodles and cutting into small pellets subsequently keeping the said pellets in an oven at 75-80° C. for a period ranging between 12-16 hrs and after curing converting pellets into inter-polymer film;

c) benzylic haloginating the inter-polymer film as obtained in step (a) or (b) by treating inter-polymer film with a halogenations agent in mole ratio 1:1 to 2.5:1 in respect of p-methylstyrene, benzoyl peroxide and chlorinated solvent under stirring at a temperature ranging between 75-80° C. for a period ranging from 5-10 hrs under photo irradiation to obtain halogenated interpolymer film;

d) providing quaternisation of halogenated inter polymer film as obtained in step (b) to obtain inter-polymer anion exchange membrane In an embodiment of the present invention binder used in step (b) is selected from the group consisting of polyethylene, chlorinated and fluorinated polymers, polycarbonate, and polyester.

In one embodiment of the present invention polyethylene binder is selected from the group consisting of HDPE, LDPE, LLDPE or mixtures thereof.

In another embodiment of the present invention, the melted mixture of binder in step (b) is prepared by heating HDPE, LLDPE and xylene at a temperature ranging between 140-160° C. to melt PE and homogenise followed by adding toluene into the PE melt and cooling the mixture at a temperature ranging between 80-90° C. to obtain melted mixture of binder.

Still in another embodiment of the present invention the films were of 0.1-0.3 mm thickness and contained 20-55% p-MS and 40-80% binder by weight.

Still in another embodiment of the present invention halogenation in step (c) at benzylic position involves chlorination or bromination or iodination and preferably bromination.

Still in another embodiment of the present invention bromination is carried out by N-bromosuccinimide or liquid bromine or 2:1 bromide-bromate.

Still in another embodiment of the present invention photoirradiation in step (c) is done by tungsten lamp, solar radiation, CFL lamp, LED lamp as light source.

Still in another embodiment of the present invention the degree of mono bromination of p-MS is 40-90%.

Still in another embodiment of the present invention the brominated film having 8-16% bromine by weight is quaternized employing tertiary amines and phosphines.

Still in another embodiment of the present invention the degree of quaternization is 80-100%.

Still in another embodiment of the present invention the membrane is conditioned prior to evaluation of membrane properties and membrane performance.

Still in another embodiment of the present invention the Ion exchange membrane has a thickness of 0.1-0.3 mm, ion exchange capacity of 0.8-2.0 meq·g$^{-1}$ dry weight, ionic resistance of 5-35 ohm·cm$^2$, water uptake of 5-25% by weight, and transport number of 0.85-0.98.

Still in another embodiment of the present invention the Ion exchange membrane is found suitable for electrodialytic desalination and is used for all applications where such ion exchange membranes are used.

DETAILED DESCRIPTION OF THE INVENTION

Figure 1:
FIG. 1: Picture of Mixture used for the preparation of p-MS-co-DVB/PE based inter-polymer
Figure 2:
FIG. 2: Picture of blow film extruder used for the preparation of p-MS-co-DVB/PE based inter-polymer film.

The present invention relates to an improved process for the preparation of an anion exchange membrane using two different approaches. The first approach relates to preparation of p-methylstyrene-co-divinylbenene (p-MS-co-DVB) polymer by radical polymerization with benzoyl peroxide (BPO) initiator in a solution additionally containing co-dissolved polyvinyl chloride (PVC), casting films from the above polymer solution carrying out benzylic bromination of the resultant polymeric film employing N-Bromosuccinimide (NBS) and thereafter subjecting the resultant film to amination to obtain quaternary ammonium sites. The second approach involves the preparation of inter-polymer film of p-MS-co-DVB polymer by radical polymerization with BPO through melt extrusion process with the mixture of high density polyethylene (HDPE) and linear low density polyethylene (LLDPE) and conversion of this inter-polymer into thin film through blow film extrusion. Thereafter, the resulting thin film was subjected to benzylic bromination and subsequent amination to get a quaternary ammonium group. In this way, two different processes have been adopted to prepare the anion exchange membrane by a greener route by avoiding hazardous chloromethylether. The thickness and ion exchange capacities of the AEMs prepared by the former process was in the range of 0.15-0.17 mm and 1.30-1.33 meq·g$^{-1}$ while, by later process these were 0.24-0.28 mm and 0.8-0.85 meq·g$^{-1}$ respectively.

Novel Features of the Invention:

The main inventive steps involve the following:

1. Recognising that if p-methylstyrene-co-divinylbenzene (p-MS-co-DVB) type polymeric films are prepared and subjected to benzylic bromination then a bromomethyl group will get introduced which is similar to the chloromethyl group obtained when styrene-co-DVB polymer is treated with chloromethyl ether-conc. HCl.

2. Carrying out benzylic bromination directly on casted and blown extruded films.

3. Recognising further that a bromomethyl group can be aminated more readily than chloromethyl group.

4. Recognizing further that p-methylstyrene (p-MS) as monomer may have better compatibility with polyethylene binder than styrene monomer which would lead to more uniform film and membrane prepared there from.

EXAMPLES

Following are the examples given to further illustrate the invention which should not be construed to limit the scope of the present invention.

Example 1

A mixture containing p-methylstyrene (5.60 g), DVB (divinyl benzene) (1.40 g), and benzoyl peroxide (BPO) as initiator (1% (w/w) with respect to monomer mixture) were added into a solution of PVC (3 g) in 30 ml of tetrahydrofuron (THF) under constant stirring at 65° C. for 4 hrs. The resultant hot solution was poured on a glass plate and a film was cast by 'SS-304' metal roller to get uniform thickness of the film in closed casting chamber. It was dried at 30° C. for 12 hrs. Thereafter, the film was peeled off from the glass plate and un-reacted monomer and solvent were removed through washing with methanol prior to further functionalization.

Example 2

The experiment of Example-1 was repeated for the preparation of inter-polymer film by varying the composition of p-MS (5.95 g) and DVB (1.05 g), BPO (1% (w/w) with respect to the monomer mixture), while keeping other parameters constant. The film was peeled off from the glass plate and treated to remove unreacted monomer and solvent, similar to the method given in Example-1.

Example 3

The experiment of Example-1 was repeated to prepare the inter-polymer film by varying the composition of p-MS (6.3 g) and DVB (0.70 g), BPO (1% (w/w) with respect to monomer mixture) while keeping other parameters constant. The film was peeled off from the glass plate and treated to remove unreacted monomer and solvent similar to the method given in Example 1.

Example 4

This example pertains to experiments on benzylic bromination of the inter-polymer films of examples 1-3. N-bromosuccinimide (NBS), (NBS: p-MS=2.5:1 w/w) and BPO (BPO: p-MS=0.02 (w/w)) were added into 800 ml of pure and mixed chlorinated solvents ($CCl_4$; DCE; varying proportions of $CCl_4$+DCE) and the solution poured into a cylindrical glass reactor. The inter-polymer films were allowed to react in the immersed solution for 6 h at 80° C. under constant stirring in the presence of a 100 W tungsten lamp. The brominated films were then removed, washed with methanol and dried under ambient conditions. It was further dried under vacuum (5 mm Hg Exact value) at 30° C. and its Br-content was analyzed by Volhard method.

Example 5

This example pertains to the quaternization of the brominated films of example-4. The films were immersed in aqueous trimethylamine solution (30% w/w) in a closed container at 30° C. for 24 h. The contents were occasionally shaken. The resultant membrane was washed thoroughly with water to remove the adhering amine. It was thereafter conditioned by immersing in 100 ml M HCl followed by water wash till neutral pH obtained, followed by immersing in 100 ml 1 M NaOH, followed by water wash till once again neutral pH obtained. This cycle was repeated three times. The films were then kept standing in 100 ml 0.1 M NaCl solution for 24 h at 30° C. The adhering liquid on the membrane surface was wiped prior to measurement of membrane properties. (Table 1 and 2)

TABLE 1

Preparation of anion exchange membrane (AEMs) of p-MS-co-DVB/PVC film:

| S. No. | solvent | Br content after bromination/ % (w/w) | IEC of quaternized film (AEM)/ (meq · $g^{-1}$) of dry membrane | $R^m$ of quaternized film (AEM)/ ($\Omega cm^2$)[b] | WU by AEM/ (%) | Remarks |
|---|---|---|---|---|---|---|
| 1. | $CCl_4$ | 6.13 | 1.00 (AEM-1) | 2000 | 14 | Stiff and non-uniform |
| 2. | $CCl_4$/DCE (95:5 v/v) | 12.2 | 1.33 (AEM-2) | 4.00 | 22 | flexible yet stable |
| 3. | $CCl_4$/DCE (90:10 v/v) | 10.4 | 1.20 (AEM-3) | 7.00 | 24 | Soft and poor strength |
| 4. | DCE | 12.7 | 1.50 (AEM-4) | 4.00 | 16 | Very weak strength |

TABLE 2

Physicochemical and electrochemical properties of p-MS-co-DVB/PVC AEM

| S. No. | p-MS (g) | DVB (g) | Film weight/(p-MS content) g/(wt. %)[a] | NBS (g) | Bromine content in brominated film/% Br(w/w) | IEC of quaternized film (AEM) (meq · $g^{-1}$) of dry membrane | WU (%) |
|---|---|---|---|---|---|---|---|
| 1. | 6.30 | 0.70 | 7.0 (51.4) | 14.25 | 12.0-12.2 | (AEM-2) 1.30-1.33 | 18-22 |
| 2. | 5.95 | 1.05 | 7.4 (50.5) | 13.46 | 9.10-9.30 | (AEM-5) 1.00-1.02 | 14-15 |
| 3. | 5.60 | 1.40 | 7.7 (48.8) | 12.67 | 6.00-6.10 | (AEM-6) 0.80-0.85 | 11-12 |

[a]Binder weight was 3 g in all the films

Example 6

The granules of high density polyethylene (HDPE) (3.12 kg) and linear low density polyethylene (LLDPE) (0.780 kg) were added in a mixture (FIG. 1). The xylene (1.25 lit) was added into the mixture and the content was heated up to 150° C. under stirring (through sigma blade) until the mixture of PE melted and became homogeneous. Thereafter, 2.5 lit toluene was added into the mixture slowly and the temperature of the reaction chamber was cooled down to 90° C. At this temperature the mixture of p-methylstyrene (2.0 lit), DVB (105 ml), BPO (20 g) and 500 ml toluene was added into the melted mixture of PE under constant stirring at 90° C. The polymerization was continued for 4 hrs. After polymerization the temperature of the chamber was increased to 140° C. to distil out the solvent from the polymer mixture within 30 minutes. After recovering approximately 85% of the solvent from the polymer mixture, the inter-polymer of p-MS-co-DVB/PE was taken out from the reaction chamber in the form of noodles and cut into small pellets with the help of a pelletizer.

Example 7

The inter-polymer pellets of example-6 were kept in an oven at 80° C. for 14 hrs to remove unreacted monomers and solvents. After curing, the inter-polymer pellets were converted into thin film of thickness 0.280 mm through blow film extruder.

Example 8

This example pertains to experiments on benzylic bromination of the inter-polymer film of example 7. The p-MS-co-DVB/PE inter-polymer film was immersed in 500 ml of dichloro ethane at 30° C. for 24 h to swell the film prior to the bromination reaction and the reaction was carried out using NBS: p-MS ratio (1:1 molar basis) in DCE solvent for 10 h in a similar manner as given in example 4. Thereafter, the film was taken out from the reactor and washed and cleaned in a similar manner given in example 4 and Br content was measured

Example 9

The quaternization of the brominated film of example 8 was carried out by the similar procedure given in example 5, except that the reaction temperature was 50° C. instead of room temperature. The resultant membrane was washed with water to remove the adhering amine and conditioned in a similar way given in example 5. Thereafter, the ionic resistance and ion exchange capacity of this AEM was measured. (Table 3)

TABLE 3

Physicochemical properties of AEM based on p-MS-co-DVB/PE (AEM-7)

| S No | p-MS content in pristine film/% (w/w) | Br content of brominated film/% (w/w); | IEC of quaternized film (AEM-7) (meq · g$^{-1}$) of dry membrane | $R^m$ of AEM-7/ ($\Omega$cm$^2$) | WU/ % w/w |
|---|---|---|---|---|---|
| 1 | 1.792 | 8.00-8.30 | 0.80-0.96 | 25.0-35.0 | 5.30-7.80 |

TABLE 4

Physicochemical properties of AEM based on Sty-co-DVB/PE (AEM-8) and CEM (Cation exchange membrane) employed in the present studies

| S. No. | Membrane | Thickness (d) (mm) | IEC (meq · g$^{-1}$) of dry membrane | $R^m$ ($\Omega$cm$^2$) | % WU in water |
|---|---|---|---|---|---|
| 1 | AEM-8 | 0.15 | 1.40 | 9.00 | 7.30 |
| 2 | CEM | 0.17 | 1.90 | 8.00 | 6.10 |

Example 10

The EMF method was employed in the present study to estimate ($t_{Cl^-}^m$) for AEM-7 and AEM-8 using NaCl as electrolyte. The data are presented in Table 5. It can be seen that AEM-8 functionalized using CME and AEM-7 functionalized by the method of the present invention gave almost comparable transport numbers.

TABLE 5

Transport numbers computed from EMF method

| S. No. | Membrane | $EMF_{NaCl}$ | $[(t_{Cl^-}^m)_{EMF}]_{NaCl}$ |
|---|---|---|---|
| 1 | AEM-7 | 0.495 | 0.948 |
| 2 | AEM-8 | 0.507 | 0.958 |

Activity coefficient values of 0.798 and 0.922 were used for 0.1 M and 0.01 M NaCl solutions for computation of activities.

Example 11

Figure 3:
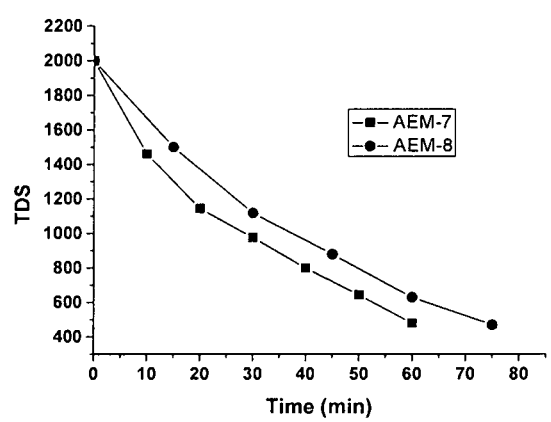
FIG. 3: TDS vs. time plot for desalination of brackish water of TDS 2000 mg/L using AEM-7 and AEM-8 with CEM at an applied potential 1.5 volt/cell pair in ED stack

ED experiments were performed in a laboratory-scale unit to assess the relative merits of AEM-7 and AEM-8 for the desalination of brackish water. FIG. 3 shows the plot of TDS versus time for AEM-7 obtained by the method of the present invention and AEM-8 obtained by CME route. AEM-7 gave more efficient desalination, with a value of ca. 500 mg/L TDS being achieved within 60 min compared to 75 min for AEM-8. This invention shows that besides being a greener route, membrane homogeneity with better dispersion of ion exchange sites was achieved through the use of p-methylstyrene in place of styrene.

Example 11

The Energy Consumption (EC) and Current Efficiency (CE) were obtained for AEM-7 and AEM-8. The data presented in Table 6 shows that the values of EC and CE of AEM-7 developed in the present invention are marginally superior to the AEM-8. The EC was the lowest for AEM-7 while CE was the highest.

TABLE 6

EC and CE data for the AEM-7 and AEM-8

| S No | AEM used in ED unit | EC (kWh/kg) | CE (%) |
|---|---|---|---|
| 1 | AEM-7 | 0.680 | 96.1 |
| 2 | AEM-8 | 0.723 | 95.7 |

Example 12

The IEC values of the membranes remained nearly identical for three cycles of regeneration. The IEC values were also checked after ED experiments and no significant differences were seen. Stability of the AEMs under thermal and oxidative conditions is also important for their practical application in electrochemical processes. After Fenton's test, the IEC and membrane weight showed a reduction while $R^m$ increased. The data are tabulated in Table 8. It can be seen that the data of the AEM-7 is matched closely to that of AEM-8. Both the membranes were also found to be hydrolytically stable.

TABLE 7

Percent reduction in IEC and weight, and increase in $R^m$ of AEMs after subjecting to Fenton's test

| S No | AEM used in ED unit | % reduction in IEC | % reduction in weight | % increase in $R_m$ |
|---|---|---|---|---|
| 2 | AEM-7 | 0.69-0.75 | 1.2-1.4 | 0.30-0.60 |
| 3 | AEM-8 | 0.81-1.00 | 1.5-1.8 | 0.50-0.90 |

Advantages of the Invention

1. The main advantage of the invention is that it makes the process of preparation of solution cast and blow extruded inter-polymer anion exchange membrane greener by dispensing with the use of chloromethyl ether.
2. Another advantage is that it enables such greening of the process without significant alteration in the operations and hence it may be more readily acceptable to membrane producers.
3. Another advantage is that although p-methylstyrene is costlier than styrene the overall impact on inter-polymer membrane cost is not substantial and such membranes should be cheaper than current commercial membranes.
4. Another advantage is that the invention teaches an even better performance in electrodialysis experiments when p-MS-co-DVB/PE-based anion exchange membrane of the present invention is used compared to the traditional styrene-co-DVB/PE-based anion exchange membrane, which improved is likely on account of better compatibility between the monomer and binder.
5. Another advantage is that the membrane stability is also seen to be marginally superior.

We claim:

1. A process for the preparation of an inter-polymer anion exchange membrane, said process comprising:
   a) preparing an inter-polymer film by adding a mixture of p-methylstyrene, divinylbenzene, benzoyl peroxide and toluene into a melted mixture of binder (PE) under constant stirring at 80–95° C. for a period ranging from 3 to 5 hours followed by increasing the temperature ranging from 130 to 140° C. to distill out the solvent from the polymer mixture to obtain noodles and cutting into small pellets subsequently keeping said pellets in an oven at 75-80° C. for a period of 12 to 16 hours and after curing converting the pellets into the inter-polymer film;
   b) benzylic haloginating the inter-polymer film as obtained in step (a) by treating the inter-polymer film with a halogenations agent in a mole ratio from 1:1 to 2.5:1 in respect of p-methyl styrene, benzoyl peroxide and chlorinated solvent under stirring at a temperature from 75 to 80° C. for a period 5 to 10 hours under photo irradiation to obtain a halogenated inter polymer film;
   c) providing quaternization of brominated inter-polymer film as obtained in step (a) to obtain the inter-polymer anion exchange membrane.

2. The process as claimed in claim 1, wherein the binder used in step (a) is selected from a group consisting of polyethylene, chlorinated and fluorinated polymers, polycarbonate, and polyester.

3. The process as claimed in claim 2, wherein polyethylene binder is selected from a group consisting of HDPE, LDPE, LLDPE and mixtures thereof.

4. The process as claimed in claim 1, wherein the melted mixture of binder in step (a) is prepared by heating HDPE, LLDPE and xylene at a temperature ranging from 140 to 160° C. to melt PE and homogenise followed by adding toluene into the PE melt and cooling the mixture at a temperature ranging from 80 to 90° C. to obtain the melted mixture of binder.

5. The process as claimed in claim 1, wherein a thickness of the films were from 0.1 to 0.3 mm and contained from 20 to 55% p-MS and from 40 to 80% binder by weight.

6. The process as claimed in claim 1, wherein halogenation in step (c) at benzylic position involves:
   chlorination or bromination; or
   iodination and bromination.

7. The process as claimed in claim 6, wherein bromination is carried out by N-bromosuccinimide or liquid bromine or 2:1 bromide-bromate.

8. The process as claimed in claim 1, wherein photoirradiation in step (b) is done by tungsten lamp, solar radiation, CFL lamp, or LED lamp as a light source.

9. The process as claimed in claim 1, wherein the degree of monobromination of p-MS is from 40 to 90%.

10. The process as claimed in claim 1, wherein the brominated film having 8-16% bromine by weight is quaternized employing tertiary amines and phosphines.

11. The process as claimed in claim 1, wherein the degree of quaternization is from 80 to 100%.

12. The process as claimed in claim 1, wherein the obtained inter-polymer anion exchange membrane is conditioned prior to evaluation of membrane properties and membrane performance.

13. The process as claimed in claim 1, wherein the obtained inter-polymer anion exchange membrane has a thickness from 0.1 to 0.3 mm, an ion exchange capacity from 0.8 to 2.0 meq·g$^{-1}$ dry weight, an ionic resistance from 5 to 35 ohm·cm$^2$, a water uptake from 5 to 25% by weight, and a transport number from 0.85 to 0.98.

14. A process for the preparation of an inter-polymer anion exchange membrane, said process comprising:
   a) preparing an inter-polymer film of p-methylstyrene-co-divinyl benzene ((p-MS-co-DVB)/binder by adding p-methylstyrene as monomer, divinylbenzene as cross-linker, benzoyl peroxide as radical initiator either neat or into a solution of PVC in a solvent under stirring at a temperature ranging from 60 to 70° C. for a period from 3 to 5 hours followed by pouring said solution on a glass plate and casting subsequently drying at temperature from 11-14 hours at 25-35° C. to obtain the inter-polymer film;
   b) benzylic haloginating the inter-polymer film as obtained in step (a) by treating the inter-polymer film with a halogenations agent in a mole ratio 1:1 to 2.5:1 in respect of p-methyl styrene, benzoyl peroxide and chlorinated solvent under stirring at temperature from 75 to 80° C. for a period of 5 to 10 hours under photo irradiation to obtain halogenated inter polymer film;

c) providing quaternization of brominated inter-polymer film as obtained in step (b) to obtain the inter-polymer anion exchange membrane.

15. The process as claimed in claim 14, wherein the films were from 0.1 to 0.3 mm in thickness and contained from 20 to 55% p-MS and from 40 to 80% binder by weight.

16. The process as claimed in claim 14, wherein halogenation in step (c) at benzylic position involves:
chlorination or bromination; or
iodination and bromination.

17. The process as claimed in claim 16, wherein bromination is carried out by N-bromosuccinimide or liquid bromine or 2:1 bromide-bromate.

18. The process as claimed in claim 14, wherein a degree of monobromination of p-MS is from 40 to 90%.

19. The process as claimed in claim 14, wherein the brominated film having 8-16% bromine by weight is quaternized employing tertiary amines and phosphines.

20. The process as claimed in claim 14, wherein a degree of quaternization is from 80 to 100%.

21. The process as claimed in claim 14, wherein the obtained inter-polymer anion exchange membrane is conditioned prior to evaluation of membrane properties and membrane performance.

22. The process as claimed in claim 14, wherein the obtained inter-polymer anion exchange membrane has a thickness from 0.1 to 0.3 mm, an ion exchange capacity from 0.8 to 2.0 meq·$g^{-1}$ dry weight, an ionic resistance from 5 to 35 ohm·$cm^2$, a water uptake from 5 to 25% by weight, and a transport number from 0.85 to 0/98.

* * * * *